US010343418B2

(12) United States Patent
Till

(10) Patent No.: US 10,343,418 B2
(45) Date of Patent: Jul. 9, 2019

(54) METHOD AND DEVICE FOR PRINTING ON HOLLOW BODIES

(71) Applicant: Till GmbH, Kelkheim (Taunus) (DE)

(72) Inventor: Volker Till, Hofheim am Taunus (DE)

(73) Assignee: TILL GMBH, Kelkheim (Taunus) (DE)

( * ) Notice: Subject to any disclaimer, the term of this patent is extended or adjusted under 35 U.S.C. 154(b) by 0 days.

(21) Appl. No.: 15/319,384

(22) PCT Filed: Jun. 8, 2015

(86) PCT No.: PCT/EP2015/062733
§ 371 (c)(1),
(2) Date: Dec. 16, 2016

(87) PCT Pub. No.: WO2015/193138
PCT Pub. Date: Dec. 23, 2015

(65) Prior Publication Data
US 2017/0144453 A1 May 25, 2017

(30) Foreign Application Priority Data

Jun. 18, 2014 (DE) .................... 10 2014 108 567

(51) Int. Cl.
*B41J 3/407* (2006.01)
*B41F 15/08* (2006.01)
*B29C 49/42* (2006.01)
*B41J 11/00* (2006.01)

(52) U.S. Cl.
CPC .......... *B41J 3/4073* (2013.01); *B29C 49/4252* (2013.01); *B41F 15/0895* (2013.01); *B41J 3/407* (2013.01); *B41J 11/008* (2013.01); *B29B 2911/14266* (2013.01); *B29C 2795/002* (2013.01)

(58) Field of Classification Search
CPC ....................................................... B41J 3/407
See application file for complete search history.

(56) References Cited

U.S. PATENT DOCUMENTS

| | | | |
|---|---|---|---|
| 2,712,704 A | 7/1955 | Mason | |
| 5,928,581 A * | 7/1999 | Dinkel | B29C 49/78 264/40.5 |
| 2006/0275588 A1* | 12/2006 | Sloan | B41M 5/0023 428/195.1 |
| 2007/0103527 A1* | 5/2007 | Satoh | B41J 2/175 347/100 |

(Continued)

FOREIGN PATENT DOCUMENTS

| | | |
|---|---|---|
| CH | 702464 A1 | 6/2011 |
| DE | 2102092 A1 | 7/1972 |

(Continued)

*Primary Examiner* — Shelby L Fidler
(74) *Attorney, Agent, or Firm* — Leydig, Voit & Mayer, Ltd.

(57) ABSTRACT

A method for printing on a hollow body which is brought by stretching into a final form during production from a perform includes, before the preform is stretched, printing on preform with at least one ink. The print is applied in a distorted manner such that presentation of a pattern which is required on the hollow body after the stretching of the preform appears upon the preform being stretched.

16 Claims, 3 Drawing Sheets

(56) References Cited

U.S. PATENT DOCUMENTS

| | | | |
|---|---|---|---|
| 2008/0218542 A1* | 9/2008 | Tezuka | B41J 3/4073 347/8 |
| 2009/0205516 A1 | 8/2009 | Till | |
| 2011/0041239 A1 | 2/2011 | Altig | |
| 2012/0231191 A1 | 9/2012 | Siegl | |
| 2013/0247272 A1* | 9/2013 | Reed | G06K 15/021 2/161.1 |
| 2014/0300676 A1* | 10/2014 | Miller | B41F 17/38 347/110 |
| 2015/0037518 A1* | 2/2015 | Haner | B29C 49/4205 428/29 |
| 2015/0203236 A1* | 7/2015 | Etesse | B29C 49/04 215/43 |
| 2015/0375493 A1* | 12/2015 | Wang | A63J 5/021 428/195.1 |
| 2016/0082754 A1* | 3/2016 | Yoshii | B41J 3/4075 347/218 |

FOREIGN PATENT DOCUMENTS

| | | | | |
|---|---|---|---|---|
| EP | 1225053 | A2 | 7/2002 | |
| EP | 2591917 | A1 | 5/2013 | |
| GB | 1320102 | A * | 6/1973 | B29C 49/52 |
| GB | 1340901 | A | 12/1973 | |
| GB | 1340974 | A | 12/1973 | |

\* cited by examiner

METHOD AND DEVICE FOR PRINTING ON HOLLOW BODIES

CROSS-REFERENCE TO PRIOR APPLICATIONS

This application is a U.S. National Phase Application under 35 U.S.C. § 371 of International Application No. PCT/EP2015/062733, filed on Jun. 8, 2015, and claims benefit to German Patent Application No. DE 10 2014 108 567.1, filed on Jun. 18, 2014. The International Application was published in German on Dec. 23, 2015 as WO 2015/193138 A1 under PCT Article 21(2).

FIELD

The invention relates to a method and to a device for printing on hollow bodies which are brought by stretching into their final form during production from preforms.

BACKGROUND

Digital printing or screen printing/offset printing has previously been used on surfaces of ready-made glass and plastics bottles. These ready-made bottles are filled by drink manufacturers in bottling plants. Hitherto, bottles have not usually been printed on site in a bottling plant, the first plants for this procedure are, however, at the planning stage. Instead, bottles have previously been labeled. In this respect, it should be noted that the production process within bottling plants has a sophisticated logistics and has mutually coordinated machines which cooperate in an interlinkage. A subsequent positioning of new systems/machines is complicated and is impracticable in most cases.

The term "machines in an interlinkage" is understood as meaning machines which are constructed in a processing line, via which the bottles are transported from one machine to the next and are processed. In the context of this description, the term "bottle" is also to be understood as a synonym for any form of container which is to be treated. The treatment can contain the steps of production, cleaning, printing and/or filling.

The present inventor has recognized a disadvantageous effect which appears during the integration of the printing of, for example plastics bottles into existing plants, is that in the meantime, a so-called block system has become established for the plants, in which block system the bottle is filled in a machine which is mechanically interlinked with the blowing machine (or more generally: stretching machine) directly, for example immediately, after the stretching procedure, in particular by blowing. The bottle is produced in a known manner by stretching the preform, which is configured such that after being stretched, in particular by blowing, the bottle receives the desired form. If appropriate, the preform can be heated for this purpose.

Thus, the finished bottle could only be printed on after a block system of this type (i.e. with a full bottle), which has the disadvantage that if a bottle explodes (which admittedly does not happen often), significant damage can be caused in the printing machine. For this reason, this arrangement is out of the question for bottles with contents which are under an internal pressure. Bottles containing still drinks also have an artificial internal pressure due to the addition of liquid nitrogen to increase the stability of the bottle (in particular a plastics bottle which is increasingly common in practice) and to thereby make it possible to stack palettes.

Furthermore, the present inventor has recognized that it is a disadvantage of the known systems that a very large number of bottling plants have already been installed, the conversion of which to digital printing by additional printing machine integration and reconstruction of the plant would entail considerable costs due to investments in additional carriers and buffers and to the standstill of the plant during reconstruction.

Thus, digital printing directly on the bottle or container can only reasonably become established with the installation of a new filling plant. However, it is impossible for a brand manufacturer of drinks to suddenly and extensively change their range of products in order not to confuse the consumer with two different types of decoration, which would inevitably be the case if the change had to be carried out over a relatively long period of time.

SUMMARY

In an embodiment, the present invention provides a method for printing on a hollow body which is brought by stretching into a final form during production from a preform. Before the preform is stretched, the preform is printed on with at least one ink. The printing is applied in a distorted manner such that presentation of a pattern which is desired on the hollow body after the stretching of the preform appears upon the preform being stretched.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
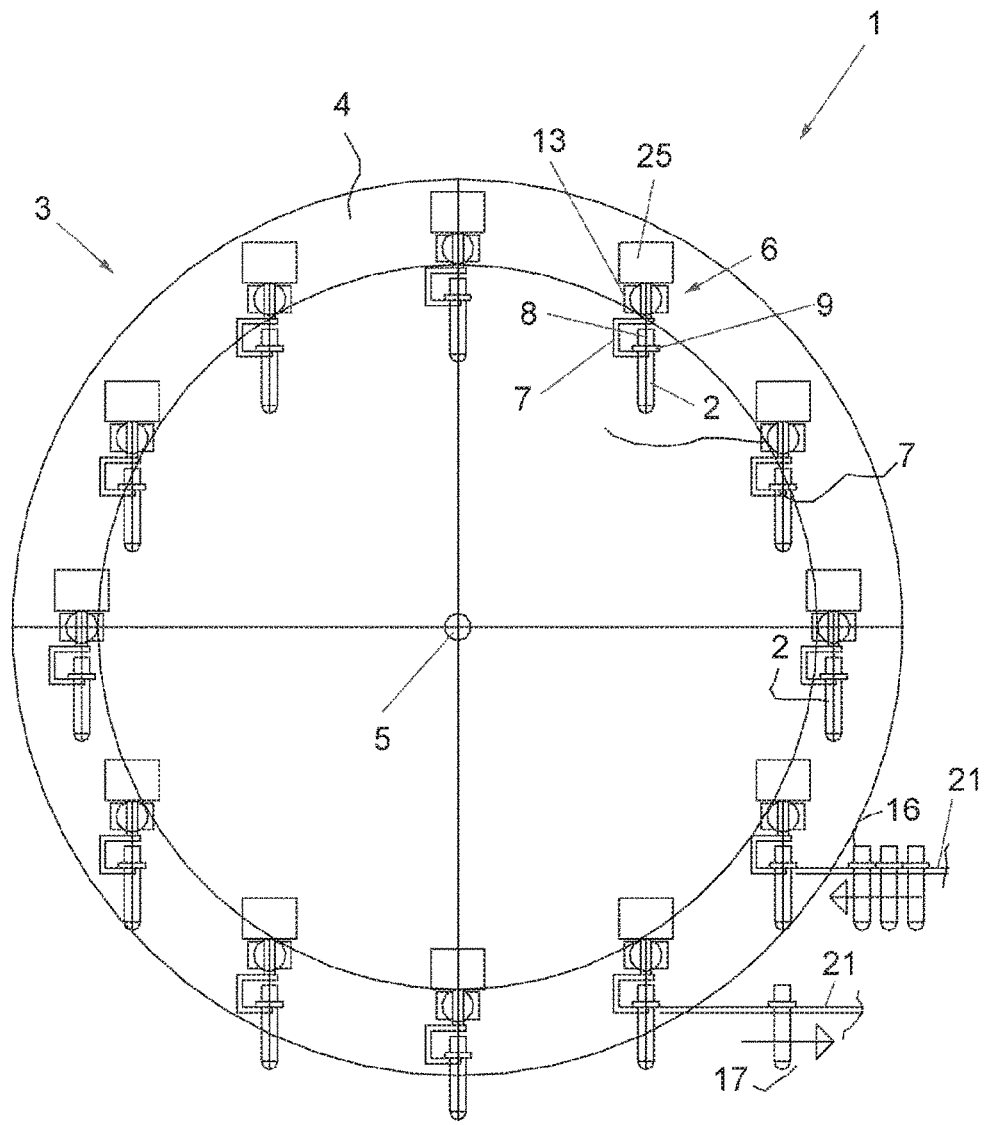
FIG. 1 is a schematic front view of a device for printing on a hollow body which is still configured as a preform and which receives its final form by subsequent stretching, according to a particularly preferred embodiment of the invention.

In an embodiment, the invention provides a possibility for printing on hollow bodies, in particular bottles, which possibility can also be integrated flexibly into existing plants.

The hollow bodies are preferably plastics or glass bottles which are supplied as prefabricated preforms and are brought into their final form by stretching before they are filled (usually in the bottling plant). The method according to the invention can be integrated particularly into this process sequence and, for this purpose the proposed device can be easily combined with existing plants.

According to an embodiment of the invention, it is proposed to print on the preform before it is stretched into the hollow body in the desired form. Printing is therefore carried out before the preform is stretched, using at least one ink in a printing station or in a plurality of printing stations arranged in tandem. In this respect, according to an embodiment of the invention, printing is carried out such that the finished decoration is only apparent on the hollow body after it has been stretched, for example by blowing. The printed image on the preform itself is thus accordingly so distorted that the desired shape and presentation of the print as a decoration or pattern is only apparent on the finished, i.e. stretched hollow body. The decoration or pattern is thus the desired printed image which can contain graphic and/or text elements in one or more inks.

According to a particularly preferred embodiment of the invention, the hollow body is a rotationally symmetrical body, in particular a container formed as a bottle. Therefore, in the following, the term "bottle" is also used synonymously for hollow bodies or containers.

For printing the preforms, the invention utilizes the fact that the preforms are stretched in an automated manner in a reproducible process and the change of shape of the preform into the hollow body, particularly into the bottle, can be predicted in a precise manner. This can either be carried out based on theoretical expansion calculations which are often already known by the manufacturer of the preform. This predictability of the dimensions of the ready-made hollow body within precisely defined accuracy limits is necessary for the application of the production of the bottles (or also other hollow bodies), because they are usually further processed, for example filled and printed or labeled in an automated manner. The invention makes use of the predictability of the shape change.

According to a preferred embodiment, it is therefore possible that the distortion of the print is determined or takes place by an imaging specification, in which or by which each dot of the (distorted) pattern on the preform is associated with a dot of the pattern on the finished hollow body. Thus, this imaging specification can be used according to the invention to calculate the (distorted) printed image by which the printer has to be controlled in order to print on the preform. The imaging specification can be determined from the theoretical expansion calculations.

Alternatively or additionally, for example for checking purposes and/or for quality control of the printing proposed according to the invention, the change of shape of the preform into the hollow body can also be determined empirically. According to an embodiment, preferred according to the invention in this respect, of the method, this can be carried out, for example by printing a defined (known) pattern onto the preform and detecting this pattern, which is then accordingly distorted, on the finished hollow body (in particular on the bottle) after stretching. The distorted pattern can be detected, for example by optically detecting the hollow body, for example by image acquisition, by means of an optical camera and by a corresponding image evaluation.

Using corresponding calculations based on the expansion calculations and/or on the imaging specification, it is also possible to ascertain the expansion of individual surface regions during stretching, for example using an interpolation in order to determine a necessary, optionally locally differing ink density on the preform.

Thus, according to an embodiment of the invention, the print is applied to the preform so that it receives its actual form and ink intensity after the stretching procedure (preferably by blowing). This approach is 100% the "mirror image" of a shrink film decoration in which the film is firstly stretched and, in the stretched state, is printed on so that the desired decoration is only apparent after shrinking.

Thus, according to an embodiment of the invention, the ink application (ink density) must be thicker or must have a significantly increased pixel density where the preform is greatly stretched and widened. Dispersing the dense pixels or the thickly applied ink provides the required ink intensity and contour of the pattern or decoration after the preform has been stretched to produce the bottle. This can be calculated using appropriate software. It is thereby also possible to correct the image before printing.

According to an embodiment of the invention, a computing unit can be provided for this purpose, the processor of which is capable of implementing and/or is configured to implement the corresponding method steps.

For known preforms and hollow bodies, this computing unit can also be configured to calculate, in an automated manner, the (distorted) printed image for the preform, which image is then printed onto the preform, from a design which is to be presented on the stretched (finished) hollow body. This can be carried out, for example using the described expansion calculations or imaging specifications, and can preferably consider both the distortion of the printed image as well as the (locally necessary) ink density.

It is proposed according to an embodiment of the invention to preferably use for this purpose inks which, as flexible inks, allow a stretch of approximately 100% to approximately 600%. Inks which have an evaporating carrier fluid for the pigments are just as suitable for this as inks which cure on a monomer basis by UV light as an energy input for polymerization with the addition of photoinitiators. It is common to both types of ink that the structure thereof can be configured so that the pigment carriers can be formed flexibly enough in order to take part in the expansions during stretching or blowing of the preform to produce the bottle, i.e. they can also be stretched in a correspondingly flexible manner. According to an embodiment, these inks can thus be inks according to the invention which dry under UV light. Alternatively however, inks which are suitable according to an embodiment of the invention can also have a carrier fluid which increases the opacity (indication of light resistance) of the print by evaporation, which is advantageous during expansion of the surface to which the print was applied, by stretching the preform. Thus, according to the invention, the preform should preferably be printed with inks which are either UV curing (UV drying) or which thicken and cure by evaporation of the carrier fluid.

According to the invention, in the latter case, it is also proposed according to a preferred embodiment of the method to accelerate evaporation by only printing on the preform when it has at least been partly heated (for example for stretching by blowing). As a result, the drying time is greatly reduced, and the possible migration and product damage by the carrier fluid are inhibited or are at least limited. Consequently, it is easily possible to remain within legal limits for the migration of chemicals into the interior of the container, in particular of a container configured as a bottle for foodstuffs and/or drinks.

This heating of the preform before printing is to be distinguished, for example by a suitable temperature threshold value, from a heating procedure of the preform in which the preform can undergo changes in shape. According to the invention, a heating procedure of this type is preferably to be avoided.

Apart from the optional heating of the preform before printing, a further advantage of the preform printing is also a lower migration of inks through the plastics, because the migration is directly dependent on the printed surface before curing. Furthermore, this depends on the period of time during which the surface is wetted with the ink which is still liquid. Due to the shorter printing time, in preforms the ink is cured sooner due to the smaller circumference of the hollow body and thereby the migration potential is also reduced. This effect can be further reinforced by the previously described heating of the preform before printing.

The application of ink can be carried out according to the invention as screen printing, offset printing (in particular web offset) and/or as digital printing, combinations of different printing methods, preferably in different printing stations and/or using different print heads also being possible.

This printing procedure can then be carried out by independent suppliers or also in separate areas. However, according to the invention a printing procedure upstream of the filling plant can also be installed directly upstream of the filling procedure to provide the decoration with current references for example, if required. Furthermore, a personalized decoration with an appropriate follow-up and/or a later re-identification of this specially blown bottle would also be possible in a bottling plant.

An advantage of the invention is that it is thereby also possible to print an extremely wide decoration using the print heads which are usually narrow. A head which usually has a print width of 70 mm and a bottle during blowing which has a stretch ratio of 1:3 produce a decoration width of 210 mm for which 3 print heads, which are oriented extremely precisely relative to one another, are usually required.

Since a preform only has a small diameter (compared to the stretched hollow body—and as an injection molding has a substantially lower tolerance than ready-blown or stretched hollow bodies (containers configured in particular as a bottle), the print head can be placed relatively closely to the preform and the gap between head and preform can be kept smaller than between a finished bottle and a print head which is arranged relative thereto. This increases the precision of the print many times over and allows the use of print heads of a higher resolution and also allows a faster printing speed due to the narrower gap. Only in this way is it possible to print more dots on the surface than in the case of finished bottles.

If bottles are usually directly printed with only 360 dpi, according to the invention, preforms can more preferably be printed with approximately 1440 dpi for the mentioned reasons. With a stretch ratio of 1:3, after blowing a resolution of 480 dpi is obtained which is significantly better than that of the direct printing of bottles. In any case, for digital printing it is preferred according to the invention to print with a resolution of more than 1000 dpi. Thus, with a stretching of the preform by a ratio of 1:3, the print quality remains at least in the order of magnitude of the known print on bottles (approximately 360 dpi).

In a preferred embodiment, the preform can be printed on directly before the hollow body is fed to a stretching machine, in particular to a blowing machine. The preform is thereby printed on immediately before being stretched to produce the hollow body in its final form, in particular as a bottle. After stretching, this bottle can then be immediately filled, if appropriate.

The bottles are usually blown for stretching while heating the preform. In this connection, when printing with inks which have an evaporating carrier fluid, the described preheating can be at least partly used for stretching by blowing during the heating procedure, which implies an advantage in terms of energy. It is thereby possible for all previous plants to be further operated without being changed, and also for block plants to be operated with preferably digitally printed bottles. Furthermore, while using the previous labeling, different decorations can still be used for different products, for example.

All the previously described inventive concepts which have been described with regard to the stretching of a preform, in particular by blowing, can also be applied to other types of stretching within the scope of expert knowledge. However, a particular advantage of applying the proposed method to the stretching of a preform by blowing is seen in that this type of stretching produces an effectively predictable change of shape which does not produce any extreme changes in the change of shape (in the sense of a spatial gradient of the change of shape on the surface of the preform).

According to the invention, an embodiment of a machine for printing the preforms is proposed. A device according to an embodiment of the invention for printing on preforms from which hollow bodies are produced in their final form by stretching, preferably by blowing, optionally while heating, has at least one printing station for printing on the preforms with at least one ink. The hollow bodies are in particular bottles which are stretched out of preforms. A preferred embodiment of the invention relates to preforms of plastics which are produced, for example by injection molding with a high tolerance accuracy. In the context of the invention, glass preforms can correspondingly be printed on, particularly during stretching by blowing.

According to an embodiment of the invention, the device is equipped with a transportation device for the cyclical movement of the preform to the at least one printing station. The printing station (or each of the printing stations) has at least one print head and is configured to rotate the preform there, i.e. in the printing station for example by means of the transportation device, in each case in front of the at least one print head or the plurality of print heads and, in so doing, to print thereon. For this purpose, the device has a computing unit which is configured to control the printing of the preform, the computing unit being configured to implement the previously described method or parts thereof for the control of the printing procedure. Therefore, it is particularly provided for the control of the printing procedure to actuate the print in a distorted manner during the printing of the preform such that the shape or presentation of the decoration which is desired on the hollow body after stretching of the preform appears when the preform is stretched, in particular when it is blown. All further aspects of the previously described method can also be realized on their own or in any combination in the computing unit for the control of the printing procedure.

The transportation device provides a cyclical movement of the preform, preferably in groups, but also individually. A preform is thus transported past the at least one print head by the transportation device, i.e. cyclically, in order to allow the preform to rotate in a manner known per se in front of the print head or print heads and to thereby be printed on. In this respect, other constructions of machines can be used for the preforms due to the smaller dimensions compared to bottles. However, according to the invention, a machine (device) of this type is also suitable in principle for printing on bottles or on other hollow bodies.

According to the invention, it is therefore proposed according to a preferred embodiment to carry out the printing on a wheel (clock wheel) as the transportation device for the preforms, which wheel rotates about a horizontal axis. Mounts for preforms are arranged regularly over the circumference of this clock wheel. The clock wheel intermittently clocks the spacing of the mounts accordingly about its axis. Arranged in the clock positions of the mounts are processing stations, in particular also the printing stations and pretreatment stations and/or aftertreatment stations. Each mount for a preform can turn or rotate said preform about its own axis in order to treat, for example to print on it accordingly on its circumferential surface in the treatment stations. The preforms are preferably configured to be rotationally symmetrical, as is usual in the case of preforms for bottles.

According to an embodiment of the invention, the drive of the rotational movement either takes place jointly for all mounts via a tooth system or alternatively by a suitable drive, separately at each station. Allocated to each drive, thus alternatively also allocated to the common drive is an encoder by which every position during the rotation of the preform is known absolutely. This is used to trigger a print starting signal, and is performed by the controller which is configured to print the preform.

According to an embodiment of the invention, it is preferably further proposed to attach the mounts to the rotor so that, during the rotation of the wheel, they themselves are rotated in opposite directions so that the preforms are always positioned in the same axial orientation relative to one another, i.e. for example they are always horizontal or they are always vertical relative to one another (paternoster principle). Furthermore, it can be proposed according to the invention that the axis of the preforms as well as the print head nozzle plate are oriented in principle, i.e. substantially vertically (or horizontally) to the wheel axis and thereby in principle, i.e. substantially parallel to the wheel disc. The wheel disc is the constructive assembly of the wheel with the mounts for the preforms, the structure extending radially from the horizontal axis of the transportation device. The print head nozzle plate has the arrangement of the print nozzles, from which the print heads discharge drops of ink which print the preforms.

Stationary print heads are arranged by the side of the clock wheel, and the wheel clocks from station to station and remains at the station for the duration of the respective treatment time which in principle corresponds to the rotation time of the preform. The print heads are to be configured such that they do not discharge the drops (drops of ink) vertically downwards, but preferably horizontally. This has the advantage that gravity always acts on the drops of ink at an angle of 90°. This arrangement prevents soiling on the print heads and on the preforms to be printed, in contrast to known principles of printing machines in which the print heads are oriented with their longitudinal axis in the axial direction of the wheel and their ink drops are discharged downwards from above. Apart from the problem of soiling which has already been mentioned, it is a disadvantage of this known arrangement of the machines that only a small angular degree is suitable for printing, as otherwise the clocking parts which are to be printed on intersect the place for the print heads during the transportation step.

However, in an arrangement which is particularly preferred according to the invention, a plurality of print heads can be arranged per station, preferably in such a way according to the invention that they are not located within the movement range of the transportation device (wheel rotation). This can be achieved in a particularly preferred manner by arranging the print heads in a stationary manner by the side of the transportation device of the preforms on the left and on the right based on the transportation direction of the preforms.

In the machine according to an embodiment of the invention for printing on a preform, one printing only lasts a third of the time compared to the printing of a finished bottle (i.e. compared to the hollow body after the preform has been stretched), although using only one print head it is possible to print on three times the surface, due to the concentration, and thus printing must optionally be carried out with a higher pixel density so that the print quality on the finished bottle during the printing of the preform corresponds to the print quality when the bottle is printed on in its final form.

This time for printing on a preform using currently conventional print heads in the device described according to the invention is, for example approximately 0.3 sec per ink and according to the invention, this could be halved using, according to the invention, two print heads in the same print station opposite one another for the same ink, because then only half a rotation of the preform is required to print over the entire circumference thereof with the printed image.

For example, assuming 0.5 sec (including non-productive time) for a printing time per preform and a further approximately 0.5 sec as the transportation time of a preform from one station to the next (with a first treatment in the first station and a second treatment in the following second station), then a single wheel as the transportation device for the entire printing machine (within the meaning of the printing device according to the invention) can print on approximately 3,600 preforms/h, if it is configured with a sufficient number of stations for the application of ink (printing) and curing.

If a greater power is required (in the sense of higher piece numbers), a plurality of wheel system devices can be arranged next to one another and can be operated in parallel. Since the dimensions of a wheel corresponds to the width of the preform of approximately 35 mm and to the length of the print head of approximately 70 mm, i.e. in total 105 mm, a machine could require only a surface of 1050 mm×1050 mm for a subsequent 36,000 blown bottles/h with 10 wheel modules.

The feed of a preform to the wheel as a cyclical transportation device of the printing device according to the invention can be proposed, according to the invention, as follows with a feed means: during printing, the (clock) wheel is stationary for the period of time of 0.5 sec stated above by way of example (i.e. more generally the printing period). Within this time, a preform which, in the case of bottles as the hollow body, is provided as usual with a neck ring, is guided in a sliding manner by the neck ring on a guide rail, is pushed by a pusher into a station of the wheel and is centered therein in the mount. By the rotary motor for the preform, a neck ring clamping means is always oriented during entry and discharge of the preform so that the preform can be pushed on or off. Alternatively, it is proposed according to the invention to position the preform on a mandrel and to fix it thereon by clamping or alternatively by a vacuum.

After printing and curing, the preform is pushed by a mechanism out of the station of the (clock) wheel into a guide rail again, on which the neck ring slides. The mechanism can be a cylinder or a motor-driven lever mechanism. Alternatively, according to the invention the preform is either blown away from its mandrel, which would be a preferred embodiment, if printing is not carried out directly upstream of the blowing procedure, or is allowed to fall, or is pushed or blown into a mount.

Alternatively, it is also proposed according to an embodiment of the invention that a wheel not only receives a preform (so-called simple use), but can simultaneously print on a plurality of preforms in parallel during one clock step (so-called multiple use). This can be carried out, for example via a plurality of feed means, in which case one feed means can preferably have in each case a feed means and a removal means as previously described.

Alternatively, according to another embodiment, it can also be proposed according to the invention to provide, instead of a clock wheel as the transportation device for the preforms, a chain drive in the longitudinal direction of transport (i.e. a clock feed along a longitudinal axis), via which the preforms are further clocked, in which case this chain drive either clocks horizontally or, in a space-saving configuration, preferably conveys the preforms vertically. Due to the linear movement, the proposed opposite rotation for vertically aligning the preforms is not provided, which can simplify the system. The at least one printing station for applying the inks is then arranged along the clock feed. A curing station for curing the ink applied in the printing station is preferably also located along the clock feed, in particular downstream of the at least one printing station. The computing unit can then be further capable of and/or can be configured to successively move the preforms to different stations (print station, curing station) and is there respectively treated either by printing or by systems for curing the ink, preferably by UV light. For the UV light treatment, the curing station then preferably has a UV lamp.

All the other proposed inventive concepts also apply to a construction of this type of the machine or device, so that they do not have to be stated again here.

FIG. 1 is a schematic front view of a device 1, also called a printing machine, for printing on a hollow body, configured as a preform 2, as a particularly preferred embodiment of the present invention. The device 1 has a transportation device 3 for the cyclical movement of the preform 2 to a printing station 11 shown in FIG. 2.

The transportation device 3 is substantially configured as a clock wheel 4 which rotates intermittently about a horizontal axis 5 of the clock wheel. Mounts 6 for the preforms 2 are arranged on this clock wheel 4, being regularly distributed over the circumference of the clock wheel 4. The mounts 6, serving as a seat for the preforms 2, are configured as bracket mounts 7, into which the preforms 2, provided with a neck ring 9, can be inserted. The bracket mount 7 can also be called a neck ring holder. Each mount 6 can rotate the preform 2 about a rotational axis 8 which coincides with the axis of symmetry of the preform 2 received in the mount 6 or the bracket mount 7. Provided as the drive 25 for the rotational movement of the rotational axis 8 is an electric motor which is allocated an encoder by which every position of the rotational axis 8 and thereby of the co-rotating preform 2 is known absolutely. This is used to trigger a print signal by the controller of the printing machine 1.

Figure 2:
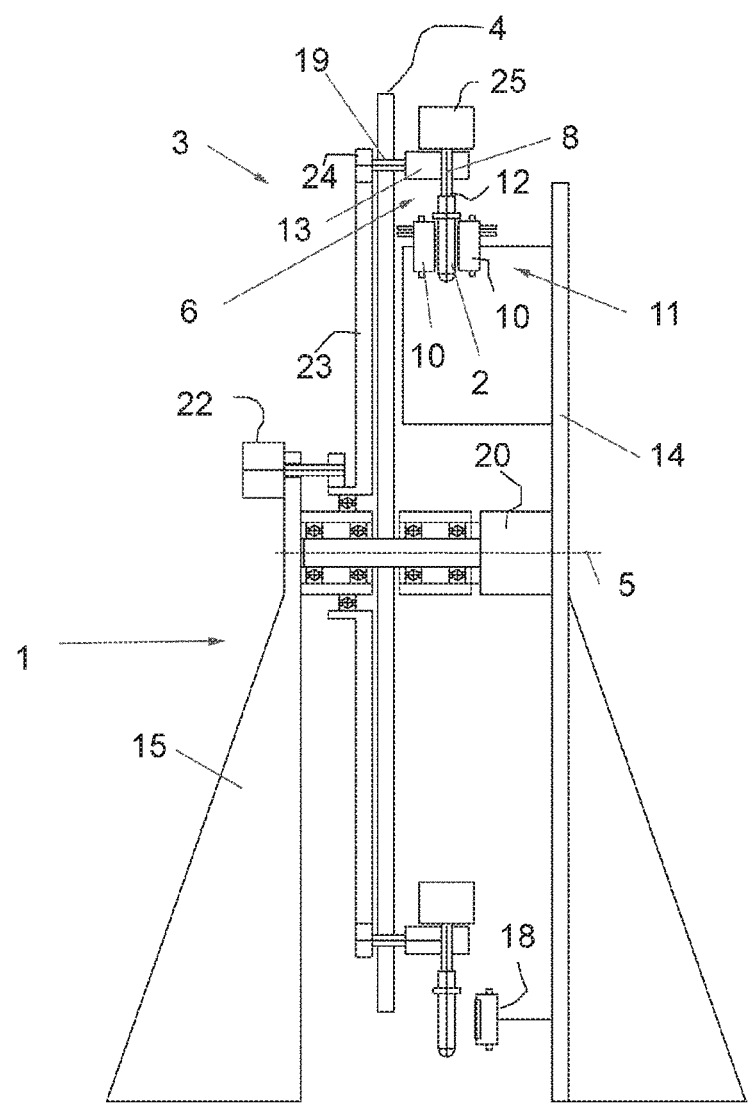
FIG. 2 is a schematic side view of the device according to FIG. 1.

FIG. 2 is a side view of the device 1 according to FIG. 1. The transportation device 3 with the clock wheel 4, mounted on the axis 5 has, in the clock position which is shown, in the region of the mount 6 a printing station 11 with two mutually opposite print heads 10 which are attached to the print head holder 14 by holders, shown as lines, and are also supplied with liquid ink for printing on the preforms 2 by these holders, shown as lines. In the drawing according to FIG. 2, the preform 2 received in the mount 6 is arranged between the mutually opposite print heads 10 which discharge drops of ink in a horizontal direction from a print head nozzle plate and thereby produce a printed image on the preform 2. In this respect, the preform 2 is rotated about the rotational axis 8 by the drive 25. The rotational axis 8 is connected to the preform 2 by a clamping means 12 so that the preform co-rotates with the rotational axis 8.

Due to their horizontal printing direction, the print nozzles of the print heads 10 are not directed upwards or downwards, so that soiling of the print heads or of the preform 2 due to gravity and from ink residues which fall from the print heads 10 does not usually occur.

In addition to the one printing station 11 shown here, a plurality of printing stations 11 is respectively arranged over the circumference of the printing machine 1 corresponding to the distributed mounts 6, so that a plurality of preforms 2 can be printed in each machine cycle.

As shown in FIG. 1, the various mounts 6 have in the different circumferential positions of the clock wheel 4 a respective orientation such that the rotational axis 8 of each mount 6 is oriented vertically. For this purpose, a holder adjusting means 13 is provided which respectively adjusts the rotational axis 8 via an axis 19 of a toothed wheel 24 so that the rotational axis 8 is oriented vertically. The toothed wheel 24 is moved by a toothed ring 23 which is controlled synchronously with a rotation of the clock wheel 4 by a rotary drive 22 in order to respectively orient the rotational axis 8 of the mounts 6 vertically. The clock wheel 4 is itself rotated about the axis 5 by a rotary drive 20. The rotary drive 22 of the toothed ring 23 and the rotary drive 20 of the clock wheel 4 can be formed by simple electric drive motors, for example by axial drive motors.

One end, on the right-hand side of the drawing, of the axis 5 with the rotary drive 20 of the clock wheel 4 is mounted on the print head holder 14. The opposite end of the axis 5 is mounted in a similarly configured holder 15 of the axis 5 of the clock wheel 4, on which the rotary drive 22 of the toothed ring 23 is also fixed.

In FIG. 2, configured at another station of the clock wheel 4, in the drawing the station opposite the illustrated printing station 11 with reference to the axis 5, is a curing station for the ink which has been applied, said station having a UV lamp 18 instead of the print heads 10. Since all the mounts 6 on the clock wheel 4 are configured identically, this mount 6, shown there, also corresponds to the mount 6 which has already been described and does not need to be described any further here.

As shown in FIG. 1, the printing machine 1 has at two selected stations, which are arrived at during the cycle time, at least one feed 16 of the preforms 2 and removal 17 of the preforms 2 which can be respectively configured as a feed means 21, on which the neck ring 9 of the preform 2 is guided. These feed means 21 insert the preforms 2 into the mount 6 (feed 16) and remove the preforms again therefrom (removal 17).

According to the invention, the feed 16 can be incorporated into a larger plant for stretching and subsequently filling the preforms 2 or hollow bodies. In this respect, for example the feed 16 can be used as an input of the preforms 6 into the system. The removal 17 then, for example immediately, delivers the preforms 2, printed on in the printing machine 1, to a blowing machine which stretches the preforms 2 to form bottles which are then filled in a subsequent filling machine.

This arrangement of the printing machine according to the invention in an entire plant with stretching machine (blowing machine) and filling machine also forms the subject-matter of the present invention.

A controller of the printing machine 1 is configured to control the printing of the preform 6 with at least one ink in the various printing stations 11, the preform 6 respectively rotating in front of the print heads 10 about its own axis and being printed on by drops of ink sprayed on by the print heads 10. For this purpose, it is particularly provided that the print is controlled in a distorted manner by the computing unit during the printing of the preform 6 such that the presentation of the decoration or pattern which is required on the hollow body after the preform 6 has been stretched is produced.

Figure 3:
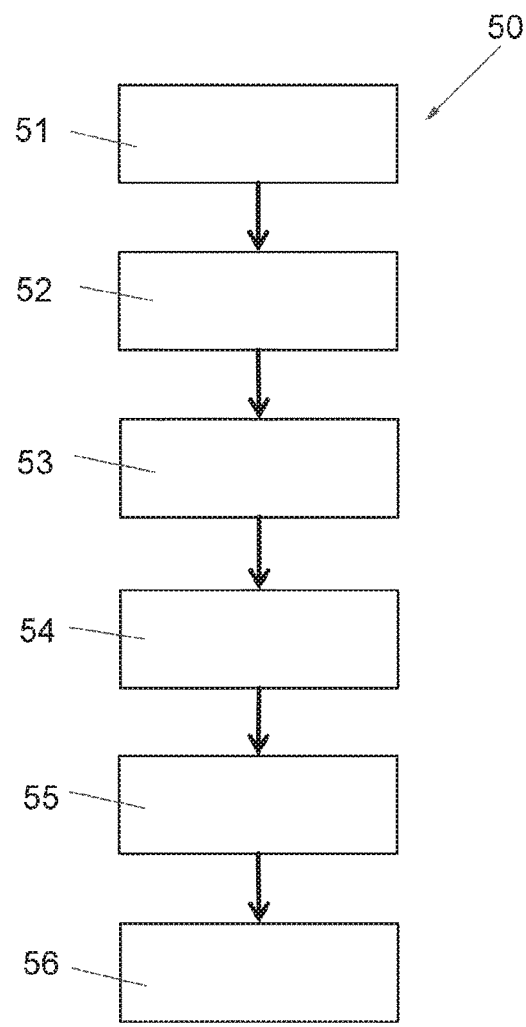
FIG. 3 schematically shows the sequence of the method according to the invention for printing on a preform according to a preferred embodiment.

For this purpose, the method outlined in the following by way of example with reference to FIG. 3 is implemented in particular.

According to the process sequence 50 of the method which is shown, in a first step 51 of the method, the computing unit of the printing machine 1 is provided with the pattern of the required presentation of the printed image on the ready-stretched hollow body.

In the following method step 52, based on theoretical expansion calculations of the preform 2 while stretching to form the hollow body, an imaging specification is determined in which or by which every dot of the distorted pattern on the preform 2 is associated with a dot of the required pattern on the finished hollow body.

In method step 53, the print image to be printed on the preform 6 is calculated using this imaging specification, both the distortion of the shape and the ink density being considered accordingly.

In a subsequent method step 54, the print with the distorted pattern is then made on the preform 2, the preform 2 being set into rotation by the mount 6 of the printing machine 1 in front of the print heads 10 and the print heads 10 being activated accordingly to print the distorted pattern as a printed image on the preform 2.

After printing in method step 55, the clock wheel 24 is rotated further and the freshly printed preform 2 is transferred to a curing station in which the preform 2 is rotated in the mount 6 in front of the UV lamp 18 to cure the freshly applied ink.

In a subsequent method step 56 which concludes the printing procedure, the preform 2 is then transferred to the removal 17 to deliver the now ready printed preform 2 to a stretching machine and to stretch it into the required form of the bottle (hollow body).

These method steps make it possible to print directly on the preform 2 instead of on the finished hollow body (bottle), so that the printing according to the invention can also be easily retrofit into plants in which after stretching, in the next procedural step, the stretched hollow body (in particular the bottle) is immediately filled.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 device for printing on a preform (printing machine)
2 hollow body (preform)
3 transportation device
4 clock wheel
5 axis of clock wheel
6 mount
7 bracket mount
8 rotational axis
9 neck ring
10 print head
11 printing station
12 clamping means of the rotational axis on the preform
13 holder adjusting means
14 print head holder
15 holder of axis of clock wheel
16 feed of preforms
17 removal of preforms
18 UV lamp
19 axis
20 rotary drive of clock wheel
21 feed means
22 rotary drive of toothed ring
23 toothed ring
24 toothed wheel
25 drive for rotational movement of rotational axis
50 process flow
51-56 method steps

The invention claimed is:

1. A method for printing on an injection molded preform having a 3-dimensional hollow body which is brought by stretching into a final form during production, the method comprising:
   calculating, using an imaging specification for a finished pattern which is desired on the hollow body in the final form after the stretching, a distorted pattern to be printed on the preform; and
   before the preform is stretched, printing the distorted pattern on the preform with at least one ink, such that presentation of the finished pattern appears upon the preform being stretched,
   wherein the hollow body of the preform has a smaller diameter than the hollow body in the final form after the stretching, and wherein, during the printing, a gap between the preform and the print head is kept smaller than a minimum gap size which would be required by tolerances of the hollow body in the final form in a case in which the printing would be performed on the hollow body in the final form.

2. The method according to claim 1, further comprising determining a distortion of the printing by an imaging specification, in which every dot of a pattern of the preform is associated with a dot of the pattern on the hollow body in the final form.

3. The method according to claim 1, wherein a quantity of the at least one ink is applied to the preform during printing such that an ink intensity which is required on the hollow body after the stretching of the preform is revealed upon the preform being stretched.

4. The method according to claim 3, further comprising establishing an expansion of individual surface regions during stretching to determine a required density of ink on the preform.

5. The method according to claim 1, further comprising calculating a printed image in an automated manner for the preform from the required presentation of the pattern on the hollow body.

6. The method according to claim 1, wherein the at least one ink is a flexible ink which allows a stretch of 100% to 600%.

7. The method according to claim 1, wherein the at least one ink includes an ink with evaporating carrier fluid printed onto a pre-warmed preform.

8. The method according to claim 1, wherein the preform is printed on by digital printing.

9. The method according to claim 8, wherein the digital printing is carried out with a resolution of more than 1000 dpi.

10. The method according to claim 1, wherein the preform is printed on before being fed to a machine for stretching the preform to produce the hollow body.

11. The method according to claim 9, wherein the digital printing is carried out with a resolution of 1440 dpi.

12. A device for printing on an injection molded preform having a 3-dimensional hollow body which is brought into a final form by stretching, the hollow body of the preform having a smaller diameter than the hollow body in the final form after the stretching, the device comprising:
   at least one printing station configured to print on the preform with at least one ink, the at least one printing station having at least one print head and being configured to respectively rotate the preform in front of the at least one print head and, in so doing, to print thereon;
   a transportation device configured to cyclically move the preform to the at least one printing station; and
   a controller configured to control the printing on the preform, the controller being configured to:
      calculate, using an imaging specification for a finished pattern which is desired on the hollow body in the final form after the stretching, a distorted pattern to be printed on the preform, and
      before the preform is stretched, cause the at least one printing station to print the distorted pattern on the preform with the at least one ink with a gap between the preform and the print head being kept smaller than a minimum gap size which would be required by tolerances of the hollow body in the final form in a case in which the printing would be performed on the hollow body in the final form, the distorted pattern being applied such that presentation of the finished pattern which is desired on the hollow body after the stretching of the preform appears upon the preform being stretched.

13. The device according to claim 12, wherein, at each of the at least one printing stations, the preforms are always oriented identically in an axial orientation, and wherein the print heads do not print on the preform downwards from above, but from a side in that the print heads are configured to discharge drops of ink horizontally.

14. The device according to claim 12, wherein the print heads are arranged in a stationary manner by a side of the transportation device of the preforms on the left and on the right according to a size of the gap.

15. The device according to claim 12, wherein the transportation device is configured such that a clock feed of the preform takes place along a longitudinal axis, the at least one printing station being arranged along the clock feed.

16. The device according to claim 15, further comprising a curing station for curing the ink, wherein the longitudinal axis is oriented vertically, and wherein the curing station is arranged along the clock feed.

* * * * *